E. S. STIMPSON.
LOOM TEMPLE.
APPLICATION FILED MAR. 23, 1912.
1,037,358.
Patented Sept. 3, 1912.
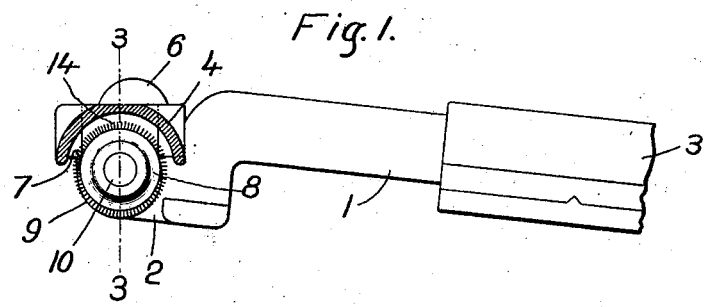
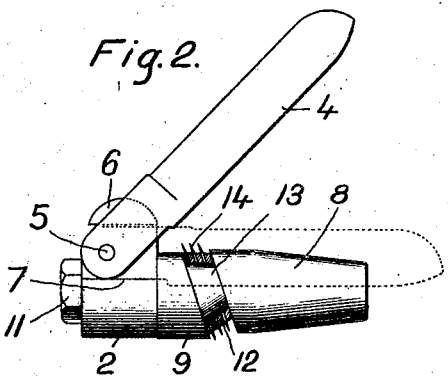
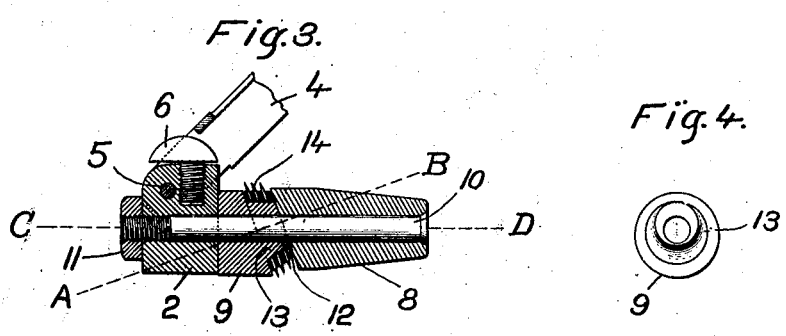
Witnesses.
Thomas J. Drummond
Warren O'Neil
Inventor.
Edward S. Stimpson,
by Edwards Heard & Smith
Atty's.

UNITED STATES PATENT OFFICE.

EDWARD S. STIMPSON, OF HOPEDALE, MASSACHUSETTS, ASSIGNOR TO DRAPER COMPANY, OF HOPEDALE, MASSACHUSETTS, A CORPORATION OF MAINE.

LOOM-TEMPLE.

1,037,358.  Specification of Letters Patent.  Patented Sept. 3, 1912.

Application filed March 23, 1912. Serial No. 685,659.

*To all whom it may concern:*

Be it known that I, EDWARD S. STIMPSON, of Hopedale, county of Worcester, State of Massachusetts, have invented an Improvement in Loom-Temples, of which the following description, in connection with the accompanying drawing, is a specification, like characters on the drawing representing like parts.

This invention relates to loom temples and more particularly to so-called sectional roll temples, wherein the cloth passes over a roll comprising revoluble toothed, and non-rotating smooth-surfaced, portions or sections suitably mounted on the shank of the temple.

In the construction of sectional roll temples heretofore it has been customary to make the revoluble toothed section as a metallic ring of frusto-conical shape, having a cylindrical bore concentric with the external conical surface, the wall of the ring having one or more series of radial holes drilled therethrough, to receive and hold pointed pins or teeth forced into the holes from the inner ends thereof. Manifestly the wall of such a ring gradually increases in thickness from the smaller to the larger end of the ring, and if provided with more than one row of teeth it was necessary to grade the teeth, the length of the teeth increasing for each added row, in order that the pointed ends of the teeth should project the same distance beyond the external surface of the ring. This involves not only the provision of graduated lengths of teeth, but also necessitates great skill and care in assembling and fitting the teeth in the ring, in order that the teeth shall project properly therefrom, making the construction of such rings expensive and laborious.

My present invention has for its object the production of a loom temple of the sectional roll type wherein the revoluble section or ring has teeth of uniform length, irrespective of the number of rows of teeth, whereby the method of construction is greatly simplified and the cost of production decreased correspondingly.

In accordance with my invention the toothed, revoluble section of the roll is made as a frusto-conical ring having walls of uniform thickness, the inner and outer conical surfaces of the ring being concentric, the holes for the teeth being drilled through the walls radially in planes parallel to each other and normal to the axis of the ring. The teeth are all of the same length, usually made of steel and pointed at their outer ends, said teeth being inserted in the holes or perforations from the interior of the ring, and as the walls thereof are of uniform thickness it follows that the teeth project equally from the external surface of the ring. The bearing on which the ring is mounted to rotate is tapered to fit easily the interior of the ring, and such bearing is secured to or forms a part of one of the fixed or nonrotating sections of the roll.

The novel features of my invention will be fully described in the subjoined specification and particularly pointed out in the following claims.

Figure 1 is an inner side elevation of a loom temple embodying my invention, with the cap in cross-section, the stand being broken off to save space; Fig. 2 is a rear end elevation of the temple, viewing Fig. 1, from the left, the cap being shown by full lines as raised, and in its normal, operative position in dotted lines, while the revoluble section of the roll is shown in section; Fig. 3 is a sectional view taken on the line 3—3, Fig. 1, through the longitudinal axis of the sectional roll; Fig. 4 is an inner end elevation of one of the fixed roll-sections and the bearing thereon upon which the toothed revoluble section is mounted.

In the drawing the shank 1 having a head 2 and slidably mounted in the stand 3, the cap 4 pivotally connected with the head at 5, and the cap-locking stud 6 on the head, may be and are all of usual construction in temples of this type, the shoulder 7 on the head limiting movement of the cap toward the roll.

Herein the sectional roll of the temple comprises two smooth-surfaced, non-rotating sections 8, 9, preferably made of polished steel, and an interposed revoluble, toothed section 12, the sections 8 and 9 being connected with the head 2 by a bolt 10 extended at right angles therefrom and concentric with the axis of the sectional roll, the bolt being held rigidly in place by a nut 11. The section 8 is tapered toward its inner end, its outer end and the adjacent end of the section 8 being in parallel planes intersecting and diagonal with relation to the axis of the roll, the said opposed ends being separated sufficiently to receive between them the revoluble toothed section or ring 12. Said ring is made of brass or composition metal, as the frustum of a hollow cone, and in accordance with my present invention the inner and outer conical surfaces of the ring are concentric and of like taper, so that the wall of the ring is of uniform thickness, as is clearly shown in Figs. 2 and 3. The ring is drilled radially to form series of perforations which lie in parallel planes normal to the central axis of the ring, the perforations being of the same depth, manifestly, and the ring is mounted to rotate upon a frusto-conical boss or bearing 13 formed as a part of the roll section 9, as herein shown, the bearing having the same taper as the ring. The bearing at its outer, smaller end abuts against the roll section 9 and thereby serves to properly space apart the sections 8 and 9, maintains the latter in proper position when the nut 11 is set up, and provides also the annular clearance for the revoluble toothed section of the roll. The pointed steel pins or teeth 14 are inserted in the perforations of the ring 12 from the interior thereof and driven outward until the butts of the pins lie flush with the inner surface of the ring, the pins being held firmly in the latter with their pointed ends projecting a uniform distance from the external surface of the ring.

It will be manifest that the number of rows of teeth is immaterial, for no matter how many rows there be all of the teeth will be of the same length and will project equally from the exterior of the ring, inasmuch as the walls thereof are of uniform thickness, the ring being so supported that the tips of the pins at the top of the roll will lie in a substantially horizontal line, and as the pins enter and leave the cloth they will travel in planes inclined toward the head 2 of the temple shank.

The proper positioning of the toothed section is effected by the inclination of the axis of rotation A—B, Fig. 3, of the said section with respect to the axis C—D of the sectional roll, the two axes intersecting within the ring 12, the axis thereof coinciding with the center or axis of the bearing 13.

It will be understood that the sectional roll may have a plurality of toothed sections, and the fixed sections of the roll may vary in construction and arrangement.

By constructing the revoluble toothed section in accordance with my invention the process of manufacture is very greatly simplified and the cost of production is correspondingly reduced, the use of teeth of the same length reducing the time, labor, cost and skill heretofore required in the manufacture of such temples.

Changes or modifications in details of construction and arrangement may be made by those skilled in the art without departing from the spirit and scope of my invention as set forth in the annexed claims.

Having fully described my invention, what I claim as new and desire to secure by Letters Patent is:

1. In a loom temple, a shank, a sectional roll over which the cloth travels and comprising non-rotatable sections rigidly attached to the shank, one of the said sections having a bearing therein at an angle to the axis of the roll, a tubular, frusto-conical section revolubly mounted on said bearing and having perforated walls of uniform thickness, and a plurality of rows of teeth of equal length fixedly held in the perforations, said teeth traveling in planes intersecting the axis of the roll at an angle thereto.

2. As an article of manufacture, a revoluble section for sectional temple rolls, consisting of a frusto-conical ring having walls of uniform thickness provided with a plurality of rows of radial perforations lying in parallel planes normal to the axis of the ring, and pin-like teeth of equal length inserted and held in said perforations and having their pointed ends projecting beyond the external surface of the ring.

In testimony whereof, I have signed my name to this specification in the presence of two subscribing witnesses.

EDWARD S. STIMPSON.

Witnesses:
  E. D. OSGOOD,
  C. W. PECKHAM.

Copies of this patent may be obtained for five cents each, by addressing the "Commissioner of Patents, Washington, D. C."